Patented Jan. 16, 1934

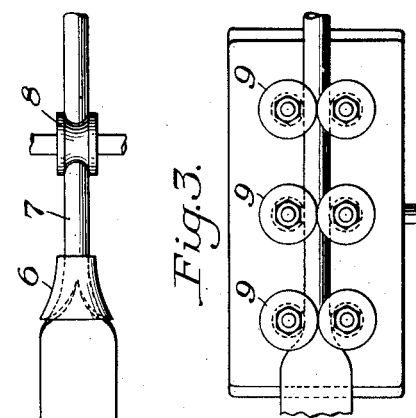
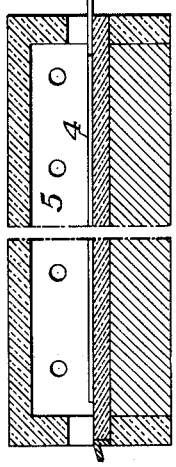
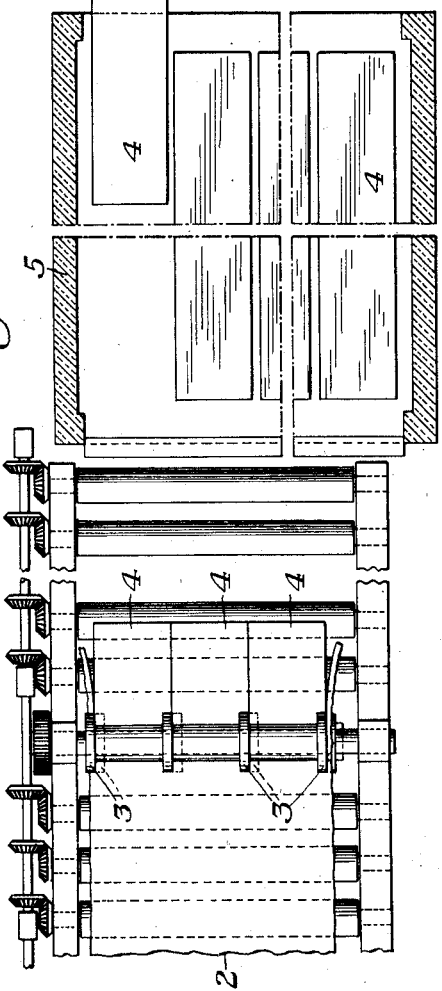
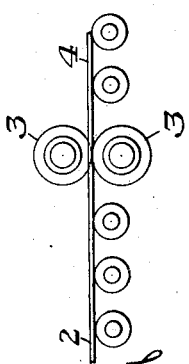

1,944,073

UNITED STATES PATENT OFFICE 1,944,073

METHOD OF FORMING TUBULAR ARTICLES

Lewis W. Fogg, Youngstown, and George W. Lentz, Canton, Ohio

Application January 19, 1931. Serial No. 509,662

4 Claims. (Cl. 29—156)

The present invention relates broadly to the art of metal working, and more particularly to the art as applicable to the formation by welding of tubes, pipes and the like.

In the art to which the present invention relates, and particularly insofar as applicable to the production of tubes by butt welding, it is customary to roll skelp in a suitable mill as nearly as possible to the required width, heat the skelp sufficiently to bring at least the edge portions thereof to a welding temperature, and then withdraw the heated skelp and pass it through either a welding bell or welding rolls. To those skilled in the art it is well known that due to the many variable factors involved, and particularly variations in width and edge characteristics of the individual skelp pieces, it is necessary to subject each piece of finished tube to a suitable test, such as a hydraulic test, for the purpose of determining whether or not the weld has been efficiently formed.

We have found that in accordance with the present invention it is possible to eliminate many of the variables and obtain a product not only characterized by a more uniform weld, but in which the different portions of the article have been subjected to uniform pressure, thereby providing a finished product of constant diameter and wall thickness.

It is also possible in accordance with the present invention to reclaim scrap skelp by slitting off the scabs and slivers that occur on the edges.

In the accompanying drawing we have shown more or less diagrammatically, for purposes of illustration only, the steps incident to the carrying out of the invention. In the drawing:

Figure 1 is a top plan view of one form of apparatus by means of which the invention may be practiced;

Figure 2 is a side elevational view of the structure illustrated in Figure 1; and Figure 3 is a partial plan view of a slightly modified embodiment of the invention.

The present invention contemplates the production of skelp of constant dimensions so treated that the edge portions thereof are free from scale of the character interfering with the production of a strong weld. It is well known that there are certain kinds of scale which if included in the seam of a butt welded article, for example, preclude the formation of a strong weld. There are other types of scale which may be readily incorporated in the weld without interfering with the desired results. It is further contemplated that in accordance with the present invention, scale of the first type shall be completely eliminated and any scale formed shall be of the character such that its inclusion in the weld does not interfere with the welding operation.

In carrying out the present invention we may produce a suitable strip or sheet 2 of commercial dimensions. This strip may comprise an individual piece of skelp as ordinarily produced, or a much wider sheet. If a sheet, it will preferably be of a width representing a multiple of the widths of the individual pieces of skelp required for the production of a given sized tube. The strip sheet having been selected, it is passed through a suitable slitter which may comprise upper and lower rotary shears 3 effective for trimming the edges of the strip or for forming a plurality of individual pieces of skelp 4 each of the required width for the formation of a given sized tube. Skelp pieces so produced will obviously be of uniform width, due to the action of the slitting rollers, and will have edges of clean metal of such nature that they may be effectively brought together.

The individual skelp pieces having been formed or trimmed, they are preferably immediately conveyed in suitable manner to a skelp heating furnace 5 and deposited in the usual way in side by side relationship therein as illustrated in Figure 1. It will be apparent that the width of the hearth may be such as to receive the skelp pieces formed from a plurality of sheets, thereby providing skelp pieces within the furnace which have been subjected to the furnace temperature for different time intervals. On the other hand, the furnace may be made narrower, and the individual pieces of skelp conveyed into the furnace in succession at substantially the same rate as that at which they are withdrawn, whereby each piece of skelp is brought to the desired welding temperature conditions just prior to its withdrawal.

The skelp having been conveyed into the furnace and heated to the temperature required, is withdrawn in the usual manner by a suitable draw bench not shown, effective for drawing it through a bell 6 by means of which the desired contour is imparted to the skelp and the edges thereof brought into welding engagement. The tube 7 thus formed may be passed through suitable sizing rolls or sizing and straightening rolls 8 to give the necessary formation as to diameter and straightness to the tube.

Inasmuch as the pieces of skelp having been accurately sheared, are of uniform width throughout their length, sizing to produce a tube of uniform diameter is not essential. In many cases, however, it is desired to slightly reduce the diameter of the tube as formed in the bell to improve the appearance of the tube and further compress the metal.

We have found that by producing clean edges on the skelp, which edges are free from scale, oxidation and the like, and passing such skelp directly into the furnace, the edges are maintained free from impurities of the character which, when included in the weld, interfere with the production of a strong joint. While the heating of the skelp in the furnace does result in some scaling, such scale is of the character not greatly injurious to the welding qualities of the strip of skelp itself and is of little consequence insofar as the welding itself is concerned.

While in Figures 1 and 2 of the drawing we have illustrated a bell of known type for effecting the shaping and welding of the skelp, it will be understood that these operations may be performed by suitable welding rolls 9 of the character illustrated, for example, in Figure 3. Where welding rolls are utilized, we preferably so mount the same that they are rotatable about vertical axes in such manner that a vertical plane through the pass will extend through the seam line of the tube being formed. It is furthermore desirable that the seam in such cases be formed at the bottom of the roll pass so as to permit any scale which is within the tube to fall freely downwardly from the inside surface thereof prior to the bringing together of the edges. It will be understood, however, that the welding rolls may be otherwise disposed, and that the seam may either be formed at the side or at the top in accordance with the particular design of the apparatus.

The invention not only lends itself to greater accuracy in the production of tubes, pipes and the like by reason of the greater uniformity in the skelp itself, but insures, for reasons pointed out, stronger and more uniform welds free from injurious scale of the character which have heretofore caused leaks and pin holes. Where a wide sheet is longitudinally split, the invention is further characterized by the production of skelp at a much lower cost than has heretofore been the case where each piece of skelp has been individually rolled. In any case, however, the pieces of skelp are of constant overall width with clean, raw edges which may be effectively welded under uniform welding pressure.

While we have herein illustrated and described a preferred embodiment of the invention, it will be understood that changes in the construction of the parts and in the various steps referred to may be made without departing either from the spirit of the invention or the scope of our broader claims.

We claim:

1. In a method of making tubular articles from flat plate, the steps including moving the plate through a slitting shear in the direction of its length, continuously introducing the slit pieces from the shear into a heating furnace substantially immediately to preclude atmospheric oxidation of the slit edges, heating the pieces in the furnace while continuing their lengthwise movement, bending the lateral edges of the heated pieces toward each other and welding them together.

2. In a method of making tubes from flat plate, the steps including moving the plate lengthwise, slitting it longitudinally into a plurality of pieces, continuously introducing the pieces into a heating furnace substantially immediately to preclude atmospheric oxidation of the slit edges, bending the lateral edges of the heated pieces toward each other and welding them together.

3. In a method of forming tubular articles from flat plate, the steps including moving a plate having substantially a width equal to the circumference of a plurality of said articles, through a continuous slitting shear and continuously introducing the sheared pieces into a furnace so as to preclude atmospheric oxidation of the sheared edges, heating the pieces in the furnace, bending their lateral edges toward each other and welding them together.

4. In a method of making tubular articles, the steps including moving the flat plate lengthwise, continuously shearing the plate into a plurality of pieces of substantially equal width, continuously introducing the sheared pieces into a heating furnace sufficiently promptly to substantially preclude the formation of oxide on the sheared edges, heating the pieces, bending their lateral edges toward each other and welding them together.

LEWIS W. FOGG.
GEORGE W. LENTZ.